United States Patent [19]
Joel, Jr.

[11] 3,950,619
[45] Apr. 13, 1976

[54] MESSAGE CHARGE CONTROL TELEPHONE ANSWERING DEVICE

[75] Inventor: Amos Edward Joel, Jr., South Orange, N.J.

[73] Assignee: Bell Telephone Laboratories, Incorporated, Murray Hill, N.J.

[22] Filed: Dec. 27, 1973

[21] Appl. No.: 429,036

[52] U.S. Cl. ............................... 179/6 C; 179/7 R
[51] Int. Cl.² .................... G11B 23/04; H04M 1/64
[58] Field of Search ......... 179/6 C, 6 R, 7 R, 7.1 R, 179/100.1 VC; 360/79, 80

[56] References Cited
UNITED STATES PATENTS

| | | | |
|---|---|---|---|
| 2,321,944 | 6/1943 | Sanders | 179/6 C |
| 2,328,562 | 9/1943 | Lesavoy | 179/100.1 VC |
| 2,693,127 | 11/1954 | Ortman | 360/80 |
| 3,394,229 | 7/1968 | Miller et al. | 179/7.1 R;6 C |

Primary Examiner—Vincent P. Canney
Attorney, Agent, or Firm—D. A. Marshall

[57] ABSTRACT

A call answering arrangement for enabling a calling subscriber to control the charging of a telephone call directed to a called telephone line equipped with an automatic telephone answering device. Incoming call signals appearing on the telephone line enable the call answering arrangement to direct the telephone answering device to transmit a prerecorded message to the calling subscriber and to record a message received from the calling subscriber. An incoming call is answered by momentarily applying answer supervision to the telephone line in response to the incoming call signals. The calling subscriber subsequently controls the interval of the answered telephone call during which the answering arrangement reapplies answer supervision to the telephone line for the purpose of charging the calling subscriber only for the calling subscriber use of the telephone service.

14 Claims, 4 Drawing Figures

MESSAGE CHARGE CONTROL TELEPHONE ANSWERING DEVICE

BACKGROUND OF THE INVENTION

1. Field of the Invention

This invention relates to telephone answering devices. In particular, it relates to the charging of telephone calls directed to an answering device utilized to automatically answer incoming telephone calls intended for a called telephone station.

2. Description of the Prior Art

Telephone answering devices provided for use with telephone stations function to recognize and automatically acknowledge telephone calls generated by telephone calling subscribers. Such answering devices are arranged to automatically answer incoming telephone calls and to transmit prerecorded messages to the calling subscribers. A telephone answering device may also be arranged to transmit a prerecorded message to a calling subscriber informing the subscriber that the answering device is arranged to record messages should the calling subscriber desire to leave a message for the called subscriber. Messages transmitted by the calling subscribers are recorded by the telephone answering device for subsequent reproduction by the called subscriber and restored to a normal or idle state after recording the transmitted messages by releasing the involved telephone central office connections. Telephone answering devices presently available for use inform calling subscribers of a wide variety of matters, such as conditions which exist in a telephone switching network, prerecorded called subscriber messages, and of the unavailability of called subscribers.

One type of answering device employed for use in the telephone switching network is arranged to answer telephone calls that cannot be completed to a called telephone station by informing a calling subscriber of conditions within the telephone switching network which prevent the completion of calls. This type of answering device is sometimes referred to as an announcement machine and is generally associated with a telephone central office trunk circuit that disconnects a calling subscriber from the announcement machine following the transmission of a prerecorded message. Since the calling subscriber did not complete the call as intended, announcement machines are arranged to answer incoming calls on a nonmessage charge basis.

Another type of answering device is employed for use in answering incoming calls directed to a called subscriber telephone station and to transmit a prerecorded message to the calling subscriber. Such answering devices are generally associated with a telephone line circuit and are arranged to record messages transmitted by the calling subscriber that are intended for a called subscriber. These answering devices answer incoming calls on a message charge basis and usually provide a medium for enabling a calling subscriber to leave a message for the called subscriber.

A calling subscriber may react unfavorably when charged for a telephone call directed to a called telephone station that is automatically answered by a telephone answering device. If the calling subscriber makes frequent calls to telephone stations equipped with answering devices, particularly to telephone stations located in distant cities, the subscriber could become irate at frequent message charges incurred when the subscriber intended to confer with called subscribers but instead received nothing more than prerecorded messages notifying the calling subscriber that the called subscribers are not available. When a calling subscriber responds to a prerecorded message by transmitting a message to be recorded, the calling subscriber receives a service for his benefit and should logically be assessed a message charge for the use of the telephone facilities. It is highly desirable that an answering device be provided that satisfies both the calling subscriber and telephone company requirements for assessing message charges for calls directed to answering devices. However, presently available answering devices appear to only answer incoming telephone calls on either a message charge or nonmessage charge basis.

Accordingly, a need exists in the art for an automatic telephone call answering device arranged for controlling the message charge intervals of an incoming telephone call. A need also exists for a telephone call answering device arranged to establish an interval following the answering of an incoming call during which calling subscribers may disconnect without incurring message charges.

SUMMARY OF THE INVENTION

In the embodiment of the invention, a call answering device intended for association with a telephone station is arranged to control time intervals of an incoming telephone call during which message charges are assessed against calling telephone subscribers. The call answering device is arranged to establish message service with calling subscribers by coupling recording and transmitting mediums to a telephone station line through the receive and send ports of a four-wire hybrid set utilized to terminate the telephone station line. Apparatus of the answering device responds to incoming call signals by momentarily applying answer supervision to the telephone station line to place the station line in an answer state and to trip the incoming call signals. The apparatus enables the transmitting medium to transmit a prerecorded message over the telephone line to the calling subscriber. Additional apparatus responds to signals generated by the transmitting medium and to message signals generated by the calling subscriber by reapplying the answer supervision to the telephone station line to place the station line in a message charge state for the purpose of initiating a message charge condition against the subscriber having originated the incoming call.

In accordance with one feature of the invention, apparatus is provided for enabling a telephone call answering device to assess message charges against a calling subscriber by controlling the time intervals of an incoming call that answer supervision is reapplied to the telephone line to place the telephone line in a message charge state.

Another feature of the invention is the provision of apparatus for enabling a call answering device to initiate a minimum message charge against a calling subscriber electing to receive a prerecorded message continuing for a time interval in excess of a predetermined minimum charge interval of time.

In accordance with another feature of the invention, apparatus is provided for enabling a call answering device to delay assessing a message charge against a calling subscriber in order that the calling subscriber may initiate a disconnect within a reasonable time without incurring a message charge for a call answered by the answering device.

In accordance with still another feature of the invention, apparatus is provided for enabling a call answering device to delay assessing message charges against a calling subscriber during the time interval of an answered incoming call occurring prior to a tone signal recording on a transmitting tape medium by monitoring message signals transmitted to the calling subscriber.

DESCRIPTION OF THE DRAWING

The foregoing objects, features, and advantages, as well as others of the invention, will be more apparent from a description of the drawing, in which.

Figure 1:
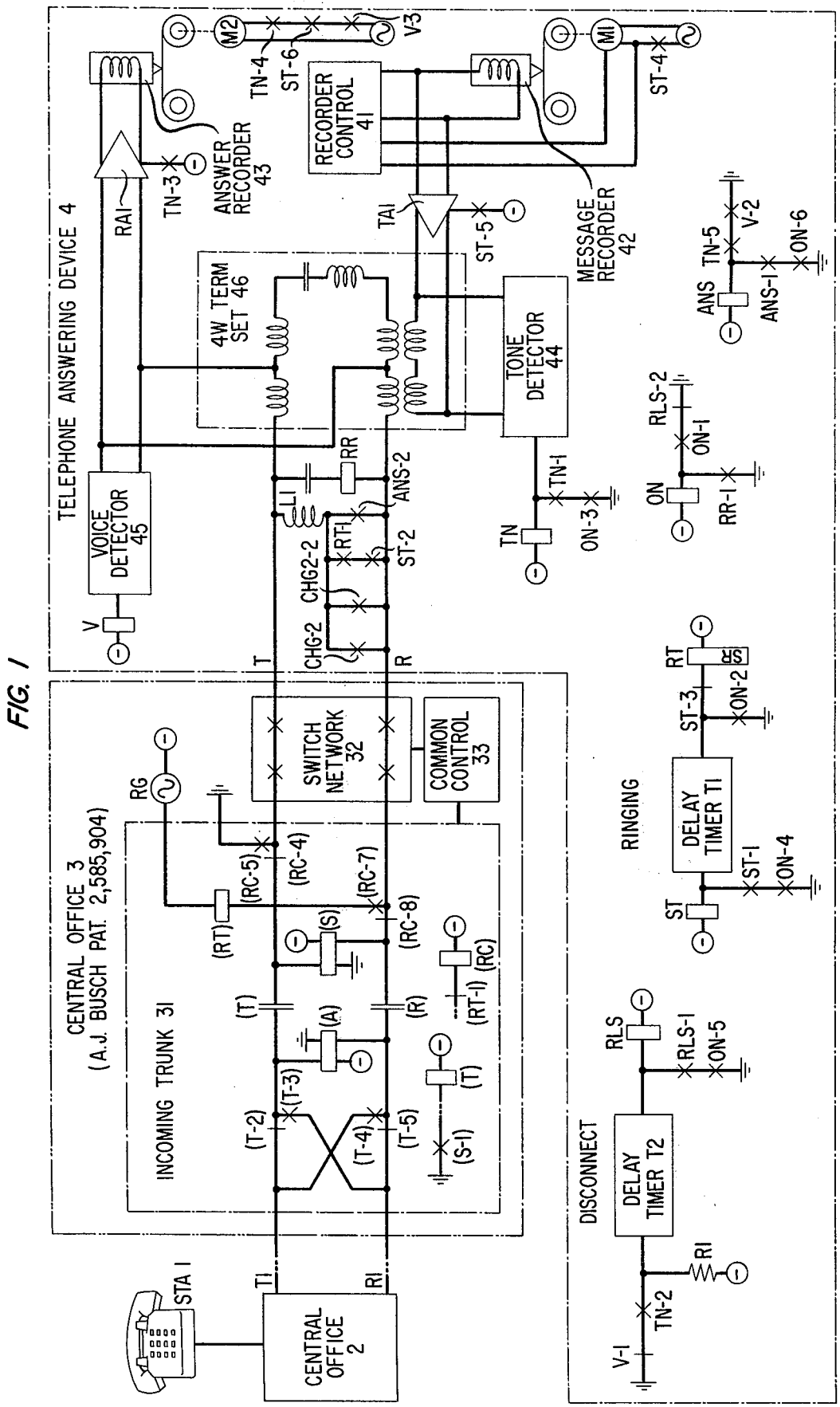
FIG. 1 sets forth a schematic diagram of a telephone answering device embodying the principles of the instant invention.

It will be noted that the drawing employs a type of notation referred to as "detached-contact" in which an X, shown intersecting a conductor, represents a normally open contact of a relay, and a bar, shown intersecting a conductor at right angles, represents a normally closed contact of a relay; "normally" referring to the unoperated condition of the relay. The principles of this type of notation are described in an article entitled "An Improved Detached-Contact-Type Schematic Circuit Drawing" by F. T. Meyer in the September, 1955 publication of the *American Institute of Electrical Engineers Transactions, Communications and Electronics*, Volume 74, pages 505 through 513.

For the purpose of illustration, FIG. 1 of the drawing employs apparatus disclosed in previously issued patents. In order to facilitate a clear understanding of the instant invention, such apparatus designations have been retained and are enclosed in parentheses to facilitate cross reference with the patent from which they were derived.

General Description

Referring now to FIG. 1 of the drawing, it is intended that telephone answering device 4, shown thereon, be associated with a telephone central office 3 provided with a conventional telephone switching system of the type disclosed in U.S. Pat. No. 2,585,904, issued on Feb. 19, 1952 to A. J. Busch. The present invention is not limited for use with a telephone switching system of this type but may be advantageously utilized with other types of switching systems. It is further intended that for the purpose of the present embodiment the above type of switching system be equipped with an incoming trunk 31 that is arranged to complete a telephone call originating in another telephone central office 2 to a telephone station line T, R terminated by telephone answering device 4.

As disclosed in FIG. 1 of the drawing, telephone answering device 4 is shown in detail and is connected by telephone line T, R to the right-hand, or line, side of switch network 32 located in central office 3. The left-hand, or trunk, side of switch network 32 terminates incoming trunk 31, which is connected by trunk facilities T1, R1 with central office 2 serving telephone station 1.

When a subscriber located, for example, at telephone station 1 goes off-hook and places an outgoing call to a telephone station equipped with telephone answering device 4, central office 2 initiates a seizure of incoming trunk 31 and connects telephone station 1 with trunk facilities T1, R1. Seizure of incoming trunk 31 enables common control 33 of central office 3 to establish a connection from incoming trunk 31 through switch network 32 to telephone line T, R in accordance with the telephone directory number dialed from telephone station 1. Once the connection has been established, incoming trunk 31 applies a ringing signal to telephone line T, R.

Telephone answering device 4 momentarily applies answer supervision to telephone line T, R to disconnect, or trip the ringing signal and starts a transmitting medium to send a prerecorded message over telephone line T, R and trunk facilities, T1, R1 to calling telephone station 1. A tone appearing on the transmitting medium at the end of the prerecorded message informs the calling subscriber located at telephone station 1 that telephone answering device 4 is prepared to record and later play back for the benefit of the called subscriber any message that the calling subscriber may desire to leave.

The transmission of the tone to the calling subscriber also enables telephone answering device 4 to initiate a disconnect timing interval. If the calling subscriber does not desire to leave a message or disconnects during the timing interval, telephone answering device 4 returns to the idle state without having reapplied answer supervision to telephone line T, R for the purpose of assessing a message charge against the calling subscriber.

If the calling subscriber desires to leave a message, the occurrence of voice signals received from the calling subscriber during the disconnect timing interval enables detector apparatus of telephone answering device 4 to reapply answer supervision to telephone line T, R to place telephone line T, R in a message charge state. The answer supervision appearing on telephone line T, R enables telephone central office 2, via incoming trunk 31, to assess message charges against telephone station 1.

Thus, telephone answering device 4 is arranged so that a calling subscriber having completed a call to a telephone station equipped with telephone answering device 4 may disconnect after receiving a prerecorded message without incurring a message charge. A calling subscriber having elected to record a message for subsequent playback by the called subscriber is assessed message charges during the recording interval until disconnect.

Figure 2:
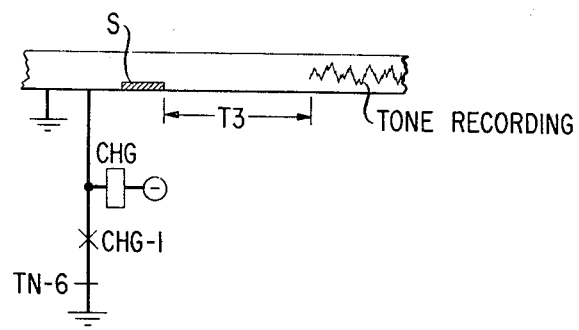
FIGS. 2, 3, and 4 illustrate additional message charge control arrangements for use with the telephone answering device set forth in FIG. 1.

In some cases it is desirable to assess a minimum message charge against a calling subscriber electing to receive a prerecorded message that lasts longer than an initial charge time interval. Telephone answering device 4 is arranged to provide this feature. FIG. 2 of the drawing sets forth message charge apparatus that is arranged to detect the presence of a metallic segment inserted in the tape of the transmitting medium at a position corresponding to some time period less than the minimum charge interval. With this arrangement the calling subscriber may disconnect prior to the operation of the message charge apparatus without incurring a message charge. Once, however, the message charge apparatus is operated telephone line T, R is placed in a message charge state and the calling subscriber is assessed a minimum message charge. Thus, a calling subscriber electing to receive a prerecorded message that continues for a time interval in excess of a predetermined minimum charge interval is assessed only a minimum message charge.

Figure 3:
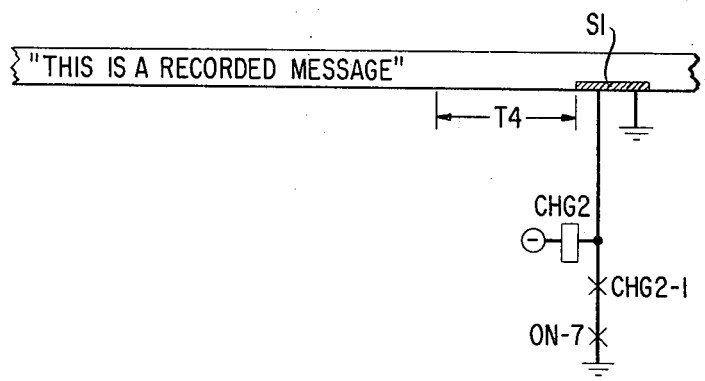

Telephone answering device 4 may also be arranged to delay the start of charging on an incoming telephone call in order that a calling subscriber recognizing that a call has been answered by an answering device may disconnect within a predetermined time interval without incurring a message charge. This feature, FIG. 3 of the drawing, is provided by arranging message charge apparatus of telephone answering device 4 to operate from a metallic segment inserted in the tape of the transmitting medium after a short opening phrase such as "This is a recorded message." If the calling subscriber elects to disconnect during the opening phrase, answer supervision is not reapplied to telephone line T, R and the calling subscriber is not assessed message charges. However, once the metallic segment is reached, the charge apparatus reconnects answer supervision across telephone line T, R to place telephone line T, R in the message charge state and thereby assess message charges against the calling subscriber until disconnect.

2. Detailed Description

1. Incoming call

On a call from telephone station 1, FIG. 1, directed to the telephone station answered by telephone answering device 4, central office 2 initiates a seizure of incoming trunk 31 in the well-known manner by placing a seizure circuit across trunk facilities T1, R1. Relay (A) operates from current flowing from ground to battery through the windings of relay (A), the normal contacts (T-2), (T-5) and the seizure circuit across trunk facilities T1, R1 to inform common control 33 of the seizure of incoming trunk 31. Common control 33 responds, as described in the aforementioned Busch patent, by receiving directory number digits dialed by the calling subscriber and establishing a connection in response thereto from incoming trunk 31 to telephone line T, R through switch network 32. Common control 33 also operates relay (RC) through normal contacts (RT-1) to close make contacts (RC-5), (RC-7) and thereby connect ground and ringing generator RG to telephone line T, R. Incoming call signals in the form of ringing current are then applied from ringing generator RG through incoming trunk 31 over telephone line T, R to telephone answering device 4.

2. Incoming call answer

Ringing current appearing on telephone line T, R operates ringing relay RR of telephone answering device 4 to close make contacts RR-1 and provide an obvious operate path for off normal relay ON. Relay ON in operating closes make contacts ON-1 and locks operated to ground through normal contacts RLS-2. Ground appearing through operated make contacts ON-2 operates slow release relay RT through normal contacts ST-3 and is applied to the input of ringing delay timer T1.

Ringing delay timer T1 initiates a short timing interval T1 during which the ringing current is allowed to continue on telephone line T, R for the purpose of providing an adequate period of audible ringing for the calling subscriber. At the end of timing interval T1, ringing delay timer T1 operates relay ST which locks to ground appearing through operated make contacts ST-1 and ON-4. With the operation of relay ST, answer supervision, comprising coil L1 in series with operated series make contacts RT-1 and ST-2, is momentarily placed across telephone line T, R to trip the ringing current supplied by central office 3.

When answer supervision is placed across telephone line T, R, an operate path for ring trip relay (RT) is established from ground through make contacts (RC-5) and switch network 32, over line conductor T through coil L1 and make contacts RT-1, ST-2, over line conductor R through switch network 32, make contacts (RC-7), the winding of relay (RT) and ringing generator RG to battery. Ring trip relay (RT) operates to open break contacts (RT-1) and thereby allow previously operated relay (RC) to release. The release of relay (RC) opens make contacts (RC-5), (RC-7) to remove ringing generator RG from telephone line T, R and closes break contacts (RC-4), (RC-8) to connect supervisory relay (S) across telephone line T, R.

When relay ST operated at end of time interval T1, break contacts ST-3 opened to initiate release of relay RT. Relay RT, being a slow release relay, maintains make contacts RT-1 in the operated state until the ringing current is removed from telephone line T, R. However, relay RT subsequently releases and opens make contacts RT-1 to remove answer supervision from across telephone line T, R before supervisory relay (S) of incoming trunk 31 can be operated. The removal of the ringing current from telephone line T, R enables ringing relay RR to release and open make contacts RR-1.

The operation of relay ST by ringing delay timer T1 closes make contacts ST-5 to supply battery to transmitting amplifier TA1. In addition, make contacts ST-4 are operated to connect a voltage source to recorder control 41 and the transmitting medium herein represented as message recorder 42. Recorder control 41 enables motor M1, in the well-known manner, to start the tape drive of message recorder 42 at the beginning of a message that has been prerecorded by the called subscriber. The prerecorded message appearing on the transmitting tape is transmitted, via transmitting amplifier TA1 and fourwire term set 46, over telephone line T, R, incoming trunk 31 and trunk facilities T1, R1 to the calling subscriber located at telephone station 1. In the well-known manner, four-wire term set 46 matches the impedance of telephone line T, R and thereby prevents the voice signals being transmitted by message recorder 42 over telephone line T, R from appearing at the input of voice detector 45.

3. Message Charge of an Incoming Call

The last part of the prerecorded message appearing on the transmitting tape contains a phrase such that a calling subscriber is asked to leave a message upon hearing a recorded tone signal. The tone signal transmitted through transmitting amplifier TA1 to the calling subscriber located at telephone station 1 enables tone detector 44 to operate relay TN which locks operated to ground through make contacts TN-1 and ON-3. Relay TN closes make contacts TN-2 to apply ground through normal contacts V-1 to the input of disconnect delay timer T2 and make contacts TN-3 to supply power to receive amplifier RA1.

Disconnect delay timer T2 initiates a timing interval T2 during which a calling subscriber may initiate a disconnect without having incurred a message charge. If telephone answering device 4 does not receive voice signals from the calling subscriber within timing interval T2, disconnect delay timer T2 operates relay RLS. Relay RLS locks operated to ground appearing through make contacts RLS-1, ON-5 and opens normal contacts RLS-2 to release off-normal relay ON. Relay ON in releasing opens all previously operated make contacts ON-2, -3, -4, -5 to recycle ringing delay timer T1 and restore telephone answering device 4 to the idle state by releasing relays TN, ST, and RLS. Since answering supervision was only momentarily applied to telephone line T, R to trip ringing, no message charges were assessed against the calling subscriber.

When the calling subscriber elects to transmit a message to be recorded for the called subscriber, receiving voice signals appearing on telephone line T, R enable voice detector 45, connected across the receive port of four-wire term set 46, to operate voice relay V. The operation of voice relay V during timing interval T2 closes make contacts V-3 so that a voltage source may be connected through make contacts ST-6, TN-4 to motor M2 of answer recorder 43. Answer recorder 43 starts to record the calling subscriber voice signals received over telephone line T, R for subsequent playback by the called subscriber.

The operation of relay V also closes contacts V-2 so that answer relay ANS may be operated by the ground appearing through closed make contacts TN-5. Answer relay ANS locks operated to ground appearing through make contacts ANS-1, ON-6 and closes make contacts ANS-2 to place answer supervision across telephone line T, R. Supervisory relay (S), located within incoming trunk 31, operates over a path extending from ground and battery through released (S) coil windings, releases break contacts (RC-4), (RC-8) and switch network 32, over telephone line T, R and through coil L1 and closed make contacts ANS-2 of telephone answering device 4.

The operation of supervisory relay (S) closes make contacts (S-1) and thereby establishes a path for the operation of relay (T). Operation of relay (T) opens break contacts (T-2), (T-5) and closes make contacts (T-3), (T-4) to reverse the battery and ground previously appearing on trunk facility conductors T1 and R1, respectively. Battery and ground now appearing respectively on trunk facility conductors R1 and T1 enables the message accounting equipment of central office 2 to assess message charges against calling telephone station 1.

Each pause in the calling subscriber voice message being recorded enables voice detector 45 of telephone answering device 4 to release voice relay V. The release of relay V closes normal contacts V-1 to apply ground to the input of disconnect delay timer T2 and thereby initiate the start of timing interval T2. Whenever the voice pause lasts longer than timing interval T2, release relay RLS operates and enables off-normal relay ON to release all operated relays and restore telephone answering device 4 to the idle state.

Thus, on an incoming call, telephone answering device 4 momentarily applies answer supervision to telephone line T, R to place telephone line T, R in the answer state and thereby trip the ringing current. Once the incoming call has been answered, a prerecorded message is transmitted to the calling subscriber. After receipt of the prerecorded message, the calling subscriber may disconnect without having incurred a message charge for the call. If, however, the calling subscriber elects to leave a message for the called subscriber, telephone answering device 4 reapplies answer supervision to telephone line T, R to place telephone line T, R in a message charge state in order that central office 2, serving calling telephone station 1, may assess message charges against calling telephone station 1 during the interval of time that the calling subscriber message is being recorded.

4. Initial Message Charges

Ofentimes it is desirable to assess a minimum message charge against a calling subscriber who elects to receive a prerecorded message that is longer than an initial charge interval. This feature is accomplished, FIG. 2, by inserting a metallic segment S on the transmitting tape of message recorder 42 a predetermined time interval T3 before the end of message tone. The time interval T3 is determined as the time interval required to enable the message accounting equipment of central office 2 to assess a minimum charge against calling telephone station 1.

On an incoming call, telephone answering device 4 momentarily applies answer supervision, FIG. 1, across telephone line T, R to trip the ringing current and begins transmitting the prerecorded message to calling telephone station 1. The metallic segment S appearing on the transmitting tape, FIG. 2, provides an operate path for charge reley CHG, which locks operated to ground appearing through operated make contacts CHG-1 and released break contacts TN-6. Charge relay CHG remains operated for time interval T3, after which the end of message tone is transmitted over the call connection to the calling subscriber.

The end of message tone enables tone detector 44, FIG. 1, to operate relay TN and open break contacts TN-6, FIG. 2, for the purpose of releasing charge relay CHG. Operation of charge relay CHG, for the time interval T3, closes make contacts CHG-2, FIG. 1, to reconnect answer supervision coil L1 across telephone line T, R. Answer supervision appearing across telephone line T, R places telephone line T, R in the message charge state and enables incoming trunk 31, in the aforementioned manner, to direct the message charge equipment of central office 2 to assess a minimum message charge against calling telephone station 1. If the calling subscriber elects to disconnect without leaving a message, the message accounting equipment of central office 2 assesses only a minimum message charge for time interval T3 against calling telephone station 1. When the calling subscriber elects to leave a message, the received voice signals enable voice detector 45 to operate relay V and thereby enable relay ANS of telephone answering device 4 to connect answer supervision coil L1 across telephone line T, R. Answer supervision appearing on telephone line T, R at this time, after the release of charge relay CHG, enables central office 3 to hold the connection and maintain the message charge state towards central office 2. Thus, a calling subscriber electing to leave a message for a called telephone subscriber is assessed message charges for both initial time interval T3 and the additional time interval that telephone answering device 4 is recording the calling subscriber's message.

In some circumstances, it may be desirable for telephone answering device 4 to assess message charges against a calling subscriber who elects to receive a prerecorded message after recognizing that a call to a telephone station has been answered by a telephone answering device. Telephone answering device 4 is arranged to accomplish this feature by delaying the start of assessing message charges against the calling subscriber for a time interval T4 following a short opening phrase of the prerecorded message, such as "This is a recorded message." As set forth in FIG. 3 of the drawing, a metallic segment S1 is inserted in the transmitting tape a time interval T4 after the opening phrase of the prerecorded message.

On an incoming call, telephone answering device 4 momentarily places answer supervision on telephone line T, R to trip the ringing current and transmits the opening phrase to the calling subscriber. The calling subscriber, recognizing that the call has been answered by a telephone answering device, may elect to disconnect prior to and during time interval T4 without incurring a message charge. If the calling telephone subscriber elects to continue receiving the prerecorded message, charge relay CHG2 operates over a path to ground established through metallic segment S1. Charge relay CHG2 locks operated to ground through series make contacts CHG2-1, ON-7 and closes make contacts CHG2-2, FIG. 1, to place telephone line T, R in a message charge state by placing answer supervision coil L1 across telephone line T, R. Answer supervision appearing on telephone line T, R enables central office 2, via incoming trunk 31 of central office 3, to assess message charges against telephone station 1 until the calling subscriber initiates a disconnect.

Prerecorded Message Control

Figure 4:
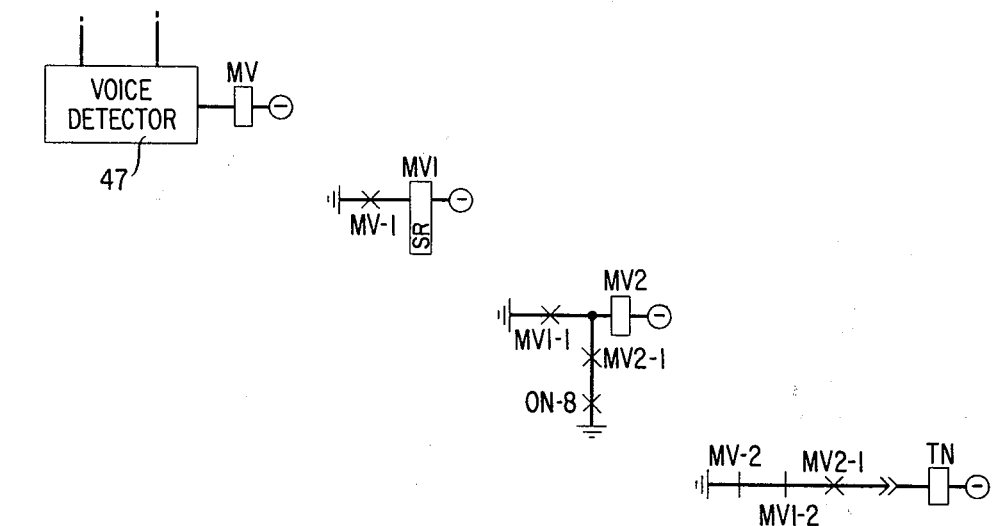

In some situations, it may be desirable to employ voice control to detect the presence of voice signals during the transmission of the prerecorded message in lieu of placing a tone at the end of the prerecorded message. To accomplish this feature, voice detector 47, FIG. 4, replaces tone detector 44, FIG. 1, across the send port of four-wine term set 46. When message recorder 42 is transmitting voice signals, voice detector 47, FIG. 4, maintains relay MV in an operated state. Operation of relay MV closes make contacts MV-1 to operate slow release relay MV-1. The resultant closing of make contacts MV1-1 operates relay MV2, which locks operated to ground appearing through series make contacts MV2-1, ON-8. Operation of relays MV2, MV, MV1 closes make contacts MV2-1 to prepare a future operate path for tone relay TN and opens break contacts MV-2, MV1-2 to prevent its operation while voice signals are being transmitted to the calling subscriber.

At the end of the transmitted voice signals, voice detector 47 releases realy MV, which opens make contacts MV-1 and closes break contact MV-2. After a short time interval, slow release relay MV1 releases and closes break contacts MV1-2. Relay TN then operates over a path from ground through released break contacts MV-2, MV1-2 and operated make contacts MV2-1. Relay TN, in the aforementioned manner, closes make contacts TN-2, FIG. 1, to enable disconnect detector T2 to initiate disconnect timing interval T2. Slow release relay MV1, FIG. 4, remains in the operate state during each momentous voice pause of the transmitted prerecorded message to prevent premature operation of relay TN.

Summary

It is appreciated from the foregoing that the flexibility, economy, and efficiency of telephone answering devices may be enhanced by the of nof an automatic telephone answering device arranged for controlling the message charge interval of incoming calls. It is further obvious from the foregoing that the instant automatic telephone answering device's unique feature of enabling a calling subscriber to control the telephone answering device to initiate a message charge condition alleviates the need to assess message charges against calling subscribers who initiate a timely disconnect after realizing that a call has been answered by an automatic telephone answering device.

While the apparatus of the invention has been disclosed in a telephone answering device, it is to be understood that such an embodiment is intended to be illustrative of the principles of the invention and that numerous other arrangements may be devised by those skilled in the art without departing from the spirit and scope of the invention.

For example, the features of the instant invention may be applied to an automatic call distributing system wherein incoming calls are queued and subsequently distributed to attendant positions that become available to service ones of the calls. In this arrangement, an incoming call is answered in the aforementioned manner by placing the incoming telephone line in an answer state and transmitting a prerecorded message to the calling subscriber indicating that an attendant position will be shortly available. When the incoming call is answered by an attendant, the previously answered telephone line is placed in a message charge state for the purpose of assessing message charges against the calling subscriber. Thus, a calling subscriber is not charged for the waiting time interval but is charged only for the time interval that the call is established with an attendant position.

What is claimed is:

1. A telephone answering device for use with a telephone line to answer a call incoming to the telephone line and generated by a calling subscriber comprising
    means responsive to incoming call signals appearing on the telephone line for answering the telephone line,
    means enabled by said answering means for transmitting and recording message signals on the answered telephone line to establish message service with the calling subscriber, and
    means for conditioning the answered telephone line to selectively assess message charges against the calling subscriber for various time intervals of the message service.

2. The telephone answering device set forth in claim 1
    wherein said answering means comprises
        means for enabling the telephone line to assume answer and message charge states, and
        means responsive to ringing signals appearing on the telephone line for briefly connecting said enabling means across the telephone line to momentarily answer the incoming call, and
    wherein said transmitting and recording means comprises
        means for transmitting prerecorded message signals to the calling subscriber and for recording message signals received from the calling subscriber, and
        means for coupling said transmitting and recording means independently to the telephone line.

3. The telephone answering device set forth in claim 2 wherein said conditioning means comprises
    first means for reconnecting said enabling means across the telephone line to place the telephone line in the message charge state during the time interval said transmitting and recording means is recording the message signals received from the calling subscriber.

4. The telephone answering device set forth in claim 3 wherein said conditioning means also comprises
second means for reconnecting said enabling means across the telephone line to assess a minimum message charge against the calling subscriber during a final portion of the time interval said transmitting and recording means is transmitting the prerecorded message signals.

5. The telephone answering device set forth in claim 4 wherein said conditioning means further comprises
means for delaying reconnection of said enabling means across the telephone line during an initial time interval of the transmission of the prerecorded message signals to enable the calling subscriber to disconnect during the initial time interval without incurring a message charge.

6. A telephone answering device for use with a telephone line to answer a call incoming to the telephone line and generated by a calling subscriber comprising
means for enabling the telephone line to assume answer and message charge states,
means connected to the telephone line for transmitting prerecorded message signals to the calling subscriber and for recording message signals received from the calling subscriber,
means responsive to incoming call signals appearing on the telephone line for answering the telephone line by placing the telephone line in the answer state, and
means for controlling said enabling means to assess message charges against the calling subscriber by changing the answer state of the telephone line to the message charge state during selected time intervals of the incoming call.

7. The telephone answering device set forth in claim 6
wherein said enabling means comprises a line holding coil, and
wherein said answering means comprises
a first timer,
first relay apparatus enabled by an appearance of ringing signals on the telephone line for initializing said first timer,
second relay apparatus enabled by the operation of said initialized first timer for activating said transmission and recording means to transmit the prerecorded message signals to the calling subscriber, and
means enabled by the operation of said first and said second relay apparatus for momentarily connecting said line holding coil across the telephone line.

8. The telephone answering device set forth in claim 7 wherein said controlling means comprises
first detector apparatus for detecting transmission of a prerecorded tone signal signifying end of transmission of the prerecorded message signals,
second detector apparatus for detecting the message signals received from the calling subscriber,
means enabled by the combined operation of said first and said second detector apparatus with the operation of said second relay apparatus for actuating said transmitting and recording means to record the received message signals, and
means enabled by the combined operation of said first and said second detector apparatus for reconnecting said line holding coil across the answered telephone line during the time interval said transmitting and recording means is recording the received message signals.

9. The telephone answering device set forth in claim 8 wherein said controlling means also comprises
a first relay having make contacts for reconnecting said line holding coil across the answered telephone line, said first relay once operated held operated by said first detector apparatus until said first detector apparatus detects the prerecorded tone signal, and
first means responsive to said transmitting and recording means for operating said first relay a predetermined interval of time prior to the transmission of the prerecorded tone signal to assess a minimum message charge against the calling subscriber.

10. The telephone answering device set forth in claim 9 wherein said controlling means further comprises
a second relay having make contacts for reconnecting said line holding coil across the answered telephone line, said second relay once operated by said first relay apparatus until disconnect of the calling subscriber, and
second means responsive to said transmitting and recording means for operating said second relay a predetermined time interval after the activation of said transmitting and recording means to enable the calling subscriber to disconnect within the predetermined time interval without incurring a message charge.

11. The telephone answering device set forth in claim 10
wherein said transmitting and recording means includes a transmitting tape medium for prerecording the message signals transmitted to the calling subscriber and a recording tape medium for recording the message signals received from the calling subscriber, and
wherein said first and second operating means includes metallic segments positioned in said transmitting tape medium for establishing operate paths for said first relay and said second relay.

12. A telephone answering device for use with a telephone line to answer an incoming call generated by a calling subscriber comprising
means for enabling the telephone line to assume answer and message charge states,
means connected to the telephone line for transmitting prerecorded message signals to the calling subscriber,
means connected to the telephone line for recording message signals received from the calling subscriber,
means responsive to incoming call signals appearing on the telephone line for momentarily connecting said enabling means across the telephone line to place the telephone line in the answer state,
means enabled by said momentarily connecting means for activating said transmitting means to transmit the prerecorded message signals to the calling subscriber over the answered telephone line,
means enabled by the received message signals for conditioning said recording means to record the received message signals,
first means responsive to the received message signals for reconnecting said enabling means across the answered telephone line to place the answered telephone line in the message charge state during the time interval of recording the received message signals, second means responsive to said transmitting means for reconnecting said enabling means across the answered telephone line a predetermined interval of time prior to end of transmission of the prerecorded message signals to assess a minimum message charge against the calling subscriber, and third means responsive to said transmitting means for reconnecting said enabling means across the answered telephone line a predetermined time interval after the activation of said transmitting means to enable the calling subscriber to initiate a timely disconnect without incurring the message charge.

13. The telephone answering device set forth in claim 12 comprising detecting means responsive to transmission of the prerecorded message signals for delaying operation of said third reconnecting means and for continuing operation of said second reconnecting means during the time interval the prerecorded message signals are transmitted to the calling subscriber.

14. A telephone answering arrangement for use in answering a telephone line utilized in establishing an incoming call from a calling telephone station to a called telephone station comprising a line holding coil for placing the telephone line in an answer and message charge state, first apparatus responsive to incoming call signals appearing on the telephone line for momentarily connecting said line holding coil across the telephone line to place the telephone line in the answer state, second apparatus enabled by operation of said first apparatus for transmitting and recording message signals on the answered telephone line to establish message service with the calling telephone station, and third apparatus responsive to signals received from the calling telephone station for selectively reconnecting the line holding coil across the answered telephone line during various times of the incoming call to place the answered telephone line in the message charge state to assess message charges against the calling telephone station for selected use of the message service.

* * * * *